(12) United States Patent
Stensland et al.

(10) Patent No.: US 11,068,840 B2
(45) Date of Patent: Jul. 20, 2021

(54) DEVICE TO CALCULATE AND DISPLAY REMAINING LENGTH OF A COILED PRODUCT

(71) Applicants: Scott A. Stensland, Kelley, IA (US); Daniel B. Kelly, Des Moines, IA (US); Paul Wedemeyer, Madrid, IA (US)

(72) Inventors: Scott A. Stensland, Kelley, IA (US); Daniel B. Kelly, Des Moines, IA (US); Paul Wedemeyer, Madrid, IA (US)

( * ) Notice: Subject to any disclaimer, the term of this patent is extended or adjusted under 35 U.S.C. 154(b) by 923 days.

(21) Appl. No.: 15/455,972

(22) Filed: Mar. 10, 2017

(65) Prior Publication Data

US 2018/0259326 A1    Sep. 13, 2018

(51) Int. Cl.
 G06Q 10/08    (2012.01)
 G01B 5/04    (2006.01)

(52) U.S. Cl.
 CPC .......... G06Q 10/087 (2013.01); G01B 5/043 (2013.01)

(58) Field of Classification Search
 CPC .................................................. G06Q 10/087
 See application file for complete search history.

(56) References Cited

U.S. PATENT DOCUMENTS

| 2,400,739 | A | * | 5/1946 | Burge | ................... | B21F 23/00 |
| | | | | | | 242/559.1 |
| 2,776,801 | A | * | 1/1957 | Wilburn | ................ | H01F 41/066 |
| | | | | | | 242/474.4 |
| 3,850,384 | A | * | 11/1974 | Priest | ................... | G01B 5/043 |
| | | | | | | 702/163 |
| 4,047,411 | A | * | 9/1977 | Foster | ................... | B21D 5/14 |
| | | | | | | 72/7.2 |
| 4,315,607 | A | | 2/1982 | Felix | | |
| 4,537,106 | A | * | 8/1985 | Rider | ................... | B65H 49/24 |
| | | | | | | 242/129.5 |
| 4,623,100 | A | * | 11/1986 | Tremblay | ........... | B65H 54/2857 |
| | | | | | | 242/478.2 |
| 4,899,945 | A | * | 2/1990 | Jones | ................... | B65H 49/34 |
| | | | | | | 242/420.6 |
| 4,925,121 | A | * | 5/1990 | Tapscott | ................. | B65H 26/06 |
| | | | | | | 101/484 |

(Continued)

FOREIGN PATENT DOCUMENTS

GB    2215467 A  *  9/1989  ........... G01D 5/2208

*Primary Examiner* — Manuel A Rivera Vargas
*Assistant Examiner* — Yaritza H Perez Bermudez
(74) *Attorney, Agent, or Firm* — McKee, Voorhees & Sease, PLC

(57) ABSTRACT

An inventory management device wherein the user inputs a material of known characteristics such as weight, thickness, and width, or length into a computer via user interface. The device calculates the length of the material and displays the remaining coiled length on a display screen. When the user is ready to feed the material, the material is rolled over a feed wheel, which turns a measure wheel. The measure wheel communicates with a computer control chip to deduct the quantity fed off the coil. The actual remaining length is shown on the display screen in real time or near real time. When the user is finished working with the material, the user can select to print a label with a barcode to affix to the material. The barcode contains characteristics of the material so the material can be inventoried and/or reused on the feeder.

24 Claims, 12 Drawing Sheets

(56) References Cited

U.S. PATENT DOCUMENTS

| | | | | |
|---|---|---|---|---|
| 5,065,527 | A * | 11/1991 | Shaw | G01B 5/043 |
| | | | | 33/734 |
| 5,100,074 | A * | 3/1992 | Jones | B65H 59/387 |
| | | | | 242/411 |
| 5,161,475 | A * | 11/1992 | Tawara | D05B 59/02 |
| | | | | 112/278 |
| 5,322,028 | A * | 6/1994 | Hashiride | D05B 59/02 |
| | | | | 112/278 |
| 6,129,796 | A | 10/2000 | Steinberg et al. | |
| 7,458,170 | B1 * | 12/2008 | Richardson | B65H 61/00 |
| | | | | 33/732 |
| 2006/0020469 | A1 * | 1/2006 | Rast | G02F 1/167 |
| | | | | 704/270 |
| 2006/0266134 | A1 * | 11/2006 | MacMillan | B08B 9/0433 |
| | | | | 73/865.8 |
| 2011/0114781 | A1 * | 5/2011 | Kimura | H02K 3/522 |
| | | | | 242/443 |
| 2012/0010817 | A1 * | 1/2012 | Mann | G01V 7/16 |
| | | | | 702/6 |
| 2018/0079233 | A1 * | 3/2018 | d'Armancourt | B41J 11/0075 |
| 2018/0259326 | A1 * | 9/2018 | Stensland | G06Q 10/087 |
| 2019/0240922 | A1 * | 8/2019 | Jansson | B29C 66/857 |

\* cited by examiner

| Decimal Thickness | Lbs. / sq. ft. |
|---|---|
| .0005" | .021 |
| .001" | .042 |
| .0015" | .063 |
| .002" | .084 |
| .003" | .126 |
| .004" | .168 |
| .005" | .210 |
| .006" | .252 |
| .007" | .294 |
| .008" | .336 |
| .009" | .378 |
| .010" | .420 |
| .011" | .460 |
| .012" | .504 |
| .013" | .546 |
| .014" | .588 |

FIG. 9

DEVICE TO CALCULATE AND DISPLAY REMAINING LENGTH OF A COILED PRODUCT

FIELD OF THE INVENTION

The invention relates generally to a device to indicate remaining material on a spool. More specifically, but not exclusively, the invention relates to a device to calculate and display remaining length of a coiled product such as rope, steel, wire, chain, or carpet on a spool of known characteristics wherein the known characteristic such as weight or length.

BACKGROUND OF THE INVENTION

Construction and manufacturing professionals do not have a method to accurately calculate the remaining length of a coiled product, such as sheet metal, while the product is on a machine cutting tool. This causes inaccurate inventory. Inaccurate inventory affects productivity analysis, cost control, forecasting, material planning. Thus, a need exists to increase the accuracy and ease of material management.

BRIEF SUMMARY OF THE INVENTION

Therefore, it is a primary object, feature, and/or advantage of the invention to improve on and/or overcome the deficiencies in the art.

It is an object, feature, and/or advantage of the invention to provide an apparatus for measuring and identifying a remaining length of coiled material.

It is another object, feature, and/or advantage of the invention to provide an apparatus for measuring and identifying a remaining length of coiled material comprising a printer operatively connected to the computing assembly.

It is another object, feature, and/or advantage of the invention to provide an apparatus for measuring and identifying a remaining length of coiled material comprising a label generated by the printer.

It is another object, feature, and/or advantage of the invention to provide an apparatus for measuring and identifying a remaining length of coiled material wherein the label includes a bar code identifying material properties.

It is another object, feature, and/or advantage of the invention to provide an apparatus for measuring and identifying a remaining length of coiled material wherein the label includes text identifying material properties.

It is yet a further object, feature, and/or advantage of the invention to provide an apparatus for measuring and identifying a remaining length of coiled material.

These and/or other objects, features, and advantages of the invention will be apparent to those skilled in the art. The invention is not to be limited to or by these objects, features and advantages. No single embodiment need provide each and every object, feature, or advantage.

Generally, the apparatus includes a housing, a measure wheel rotatably secured to the housing, and a tensioner assembly. The tensioner assembly preferably includes a pulley wheel rotatably secured to the housing and operatively connected to the measure wheel and a tensioning arm rotatably secured to the housing. Within the housing is a power supply, a computing assembly operatively connected to the measure wheel, the computing assembly which includes an I/O board, a video port, a plurality of USB ports and an Ethernet port. A display operatively connected to the computing assembly to display the length of remaining coiled material. A beginning indicia attached to a lead end of the material for identifying parameters of the material.

In an alternative embodiment, the apparatus includes a housing, a linear measuring system secured to the housing, wherein the linear measuring system includes a measure wheel, a gearbox, an axle, and a mechanical to digital sensor. The apparatus further comprises a tensioner assembly, wherein the tensioner assembly includes a pulley wheel rotatably secured to the housing and operatively connected to the measure wheel and a tensioning arm rotatably secured to the housing. Also, within the housing is a power supply, a computing assembly operatively connected to the measure wheel. The computing assembly includes an I/O board, a video port, a plurality of USB ports and an Ethernet port. A display operatively connected to the computing assembly to display the length of remaining coiled material. A beginning indicia attached to a lead end of the material for identifying parameters of the material.

BRIEF DESCRIPTION OF THE DRAWINGS

The following drawings and figures are meant to show the preferred, but not the only embodiment of the invention. Other embodiments, as discussed in this specification, are available. The scope of the present invention is not to be limited by the drawings or figures or the descriptions of them below.

FIG. 9 is a known weights lookup table.

DETAILED DESCRIPTION

Figure 1:
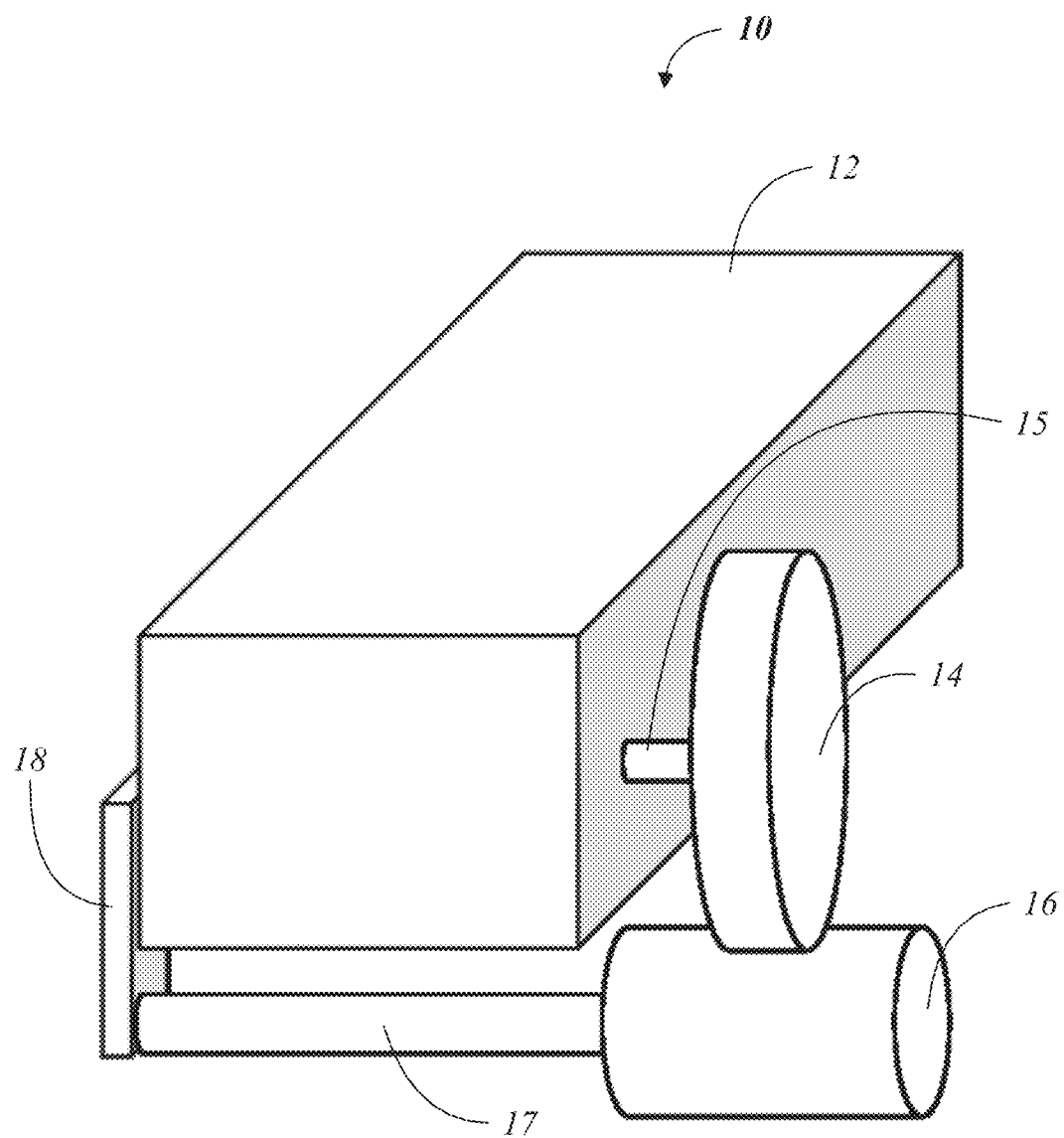
FIG. 1 is an isometric front view of the device.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

For example, in a preferred embodiment, an apparatus or device counts down the remaining length of coiled material such as rope, steel, wire, chain, carpet, etc. of known characteristics such as weight or length. The device also produces indicia such as a barcode label to tag and catalogue the material for future use. The device employs a dynamic programming language, an example of which is known as Python.

The user inputs a known material into a user interface. As discussed below, the device calculates the length of the material and displays the remaining coiled length on a display screen. When the user is ready to feed the material, the material is rolled over a feed wheel that turns a measure wheel. The measure wheel communicates with the computer/control to deduct the quantity removed off the coil.

The actual remaining length is displayed on a screen in real time or near real time. When the user is finished working with the material, the user can select to print a label with a barcode to affix to the material. The barcode contains characteristics of the material. The barcode characteristics may contain, but not be limited to a process ID (identification), material type, length remaining, specific User, and a time stamp.

The preferred embodiment of the apparatus or device 10 of the present invention as seen in FIG. 1, includes a main component housing 12 which protects and houses a computer 36 and any associated mechanical components for this invention. A measure wheel 14 turns as a material such as wire, chain, or rope which is fed through a machine tool such as, a role form/former or an extruder and measures the amount of material processed. A tension or pulley wheel 16 and associated axle 17 insures the material being processed makes and maintains contact with measure wheel 14 to eliminate slippage and increase measurement accuracy. A tension or pulley assembly 18 contains an arm and pulley spring not shown for the pulley wheel 16. Measure wheel 14 and associated axle 15 interface with a sensor (not shown).

Figure 2:
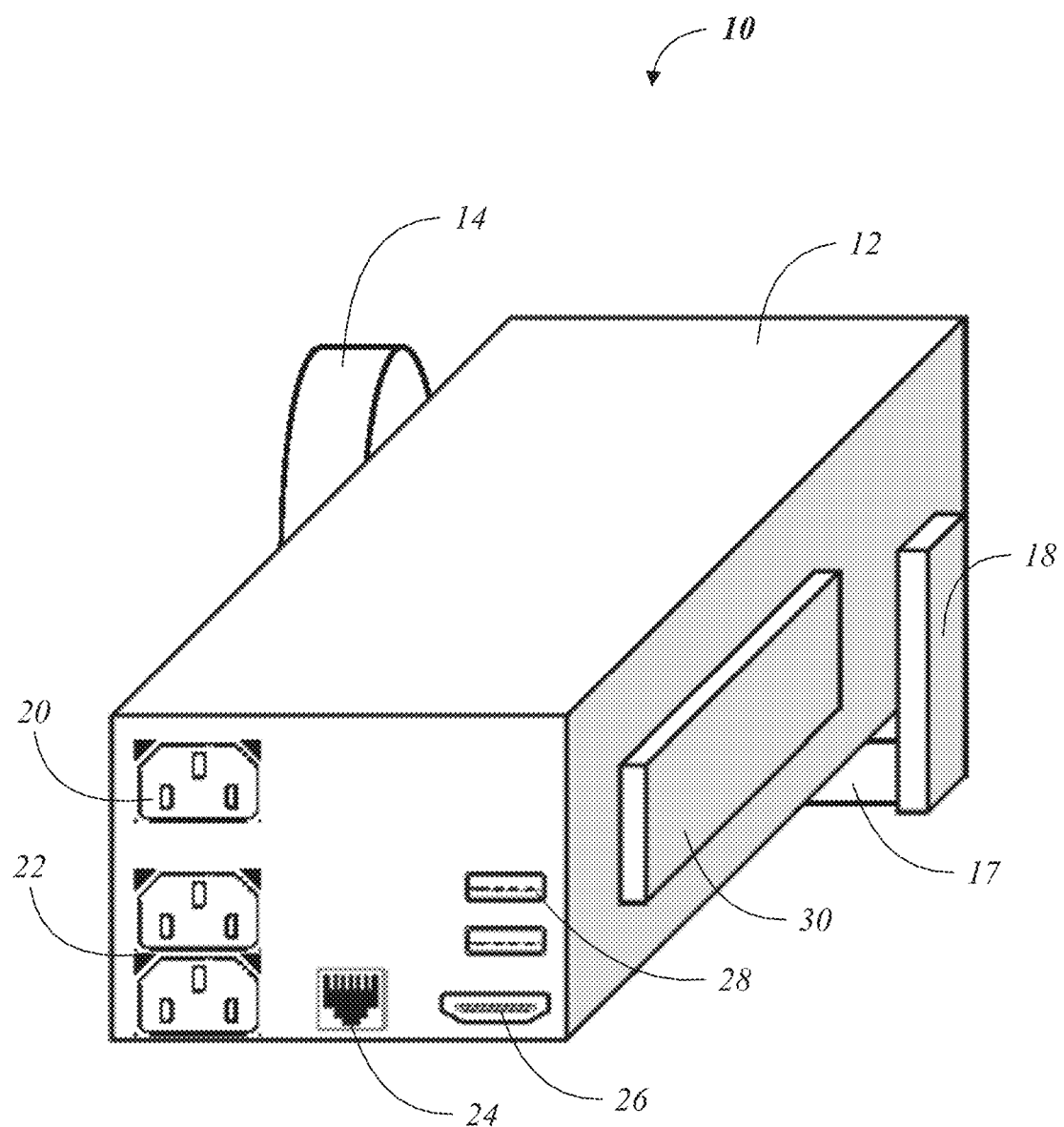
FIG. 2 is an isometric rear view of the device.

FIG. 2 is a rearward isometric view of said invention wherein the main component housing 12 and measure wheel 14 can be seen from the rear as well as tension or pulley assembly 18. A main power supply 20, supplies power for all system components, most likely 120 VAC. Auxiliary power out ports 22 supply power for the touch screen monitor 42 and label printer 50. A network interface 24 is an RJ45 connector. Network interface 24 allows data communication to the label printer 50 and/or any other network devices such as a mini PC. HDMI interface 26 is for the touch screen 42. USB ports 28 are for the touch screen 42 and any peripheral devices such as the label printer 50. A universal mounting bracket 30 allows mounting to a variety of machine tools. Mounting bracket 30 is constructed from a length of angle iron with pre-drilled holes or straps to match the specific machine tool to be utilized.

Figure 3:
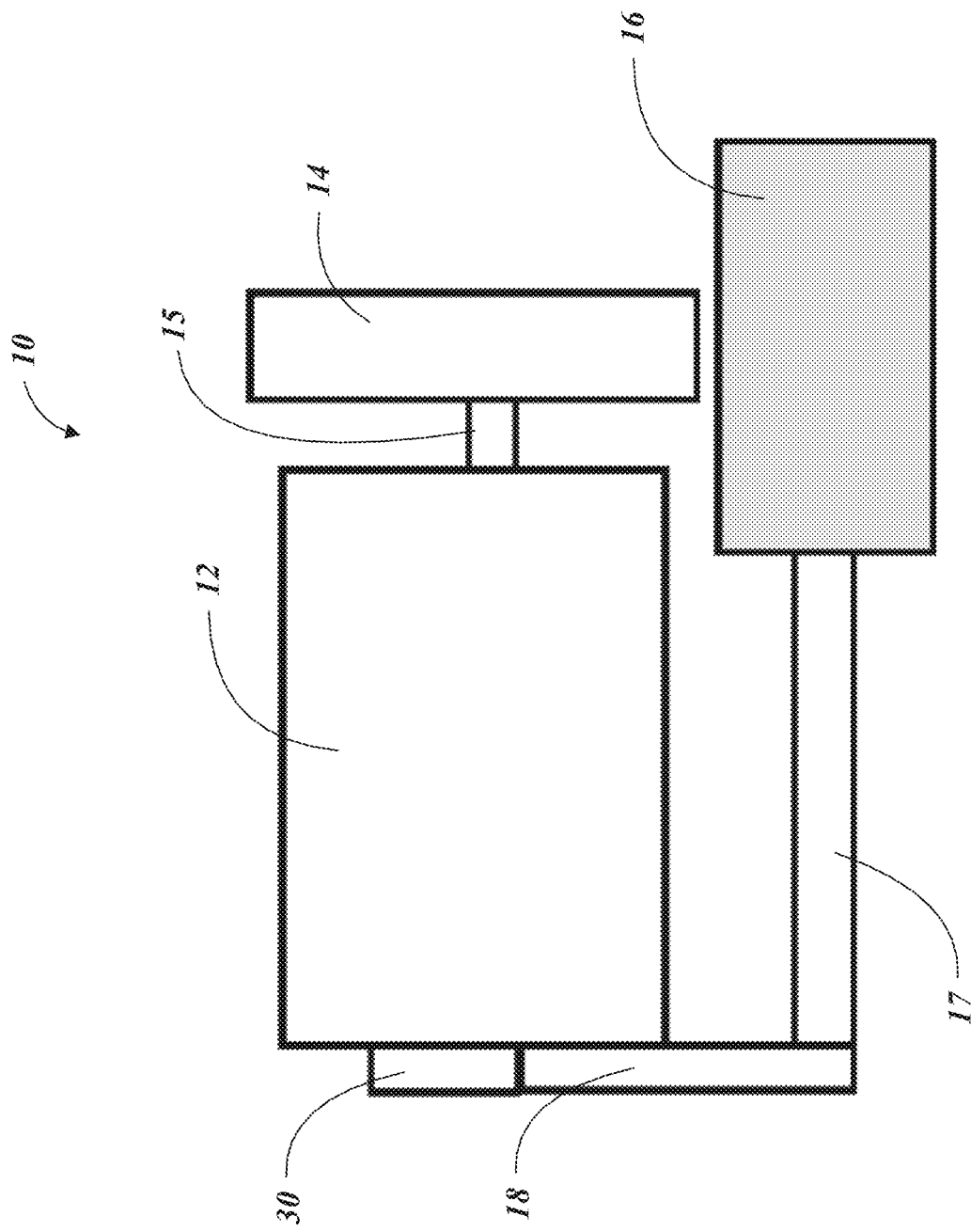
FIG. 3 is a front view of the device.
Figure 4A:
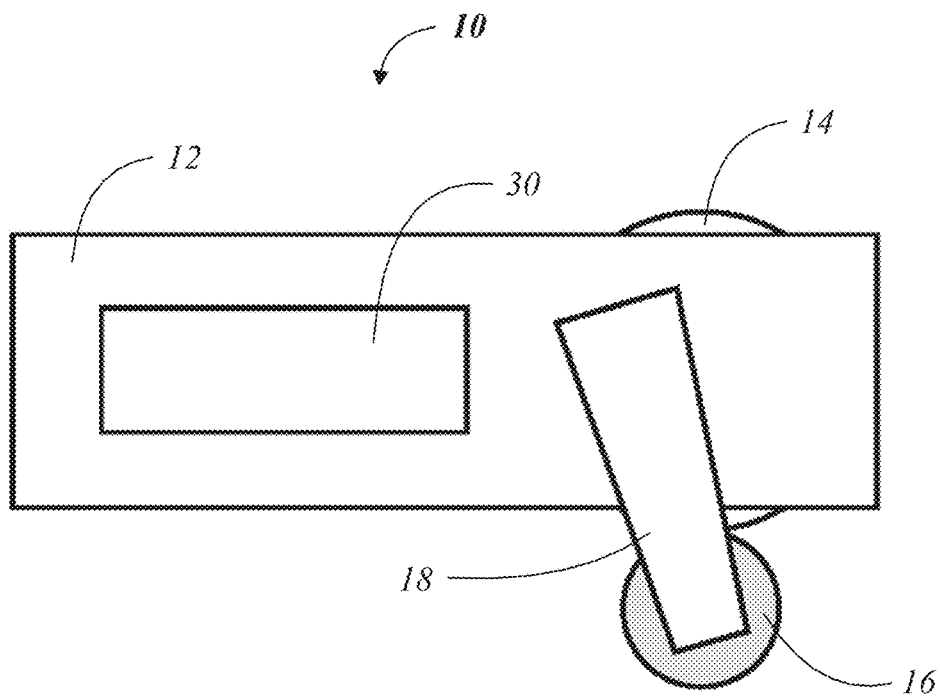
FIG. 4A is a left side view of the device.
Figure 4B:
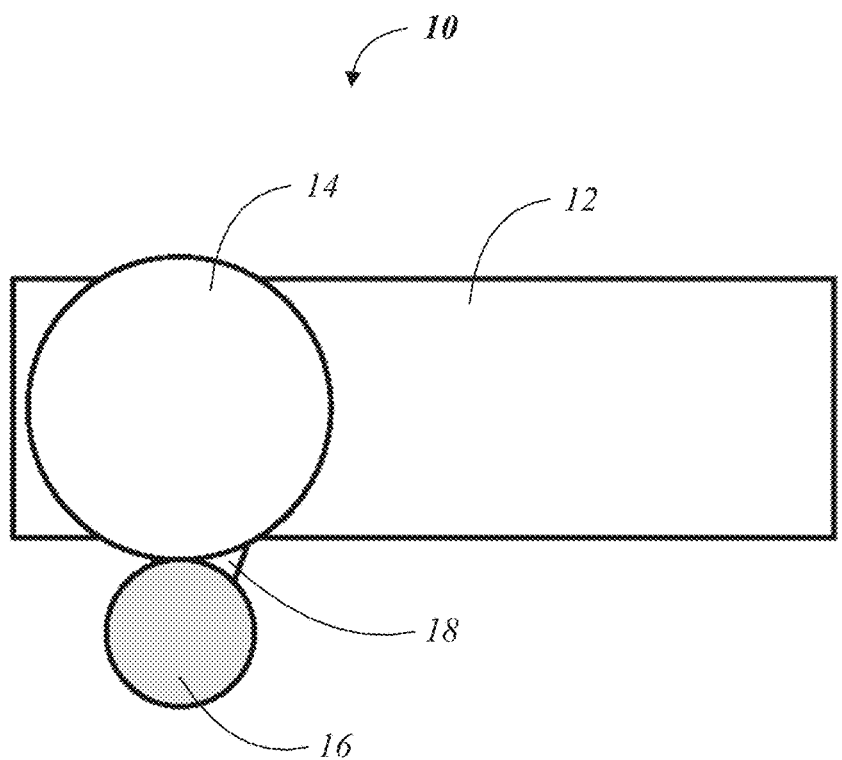
FIG. 4B is a right side view of the device.
Figure 5:
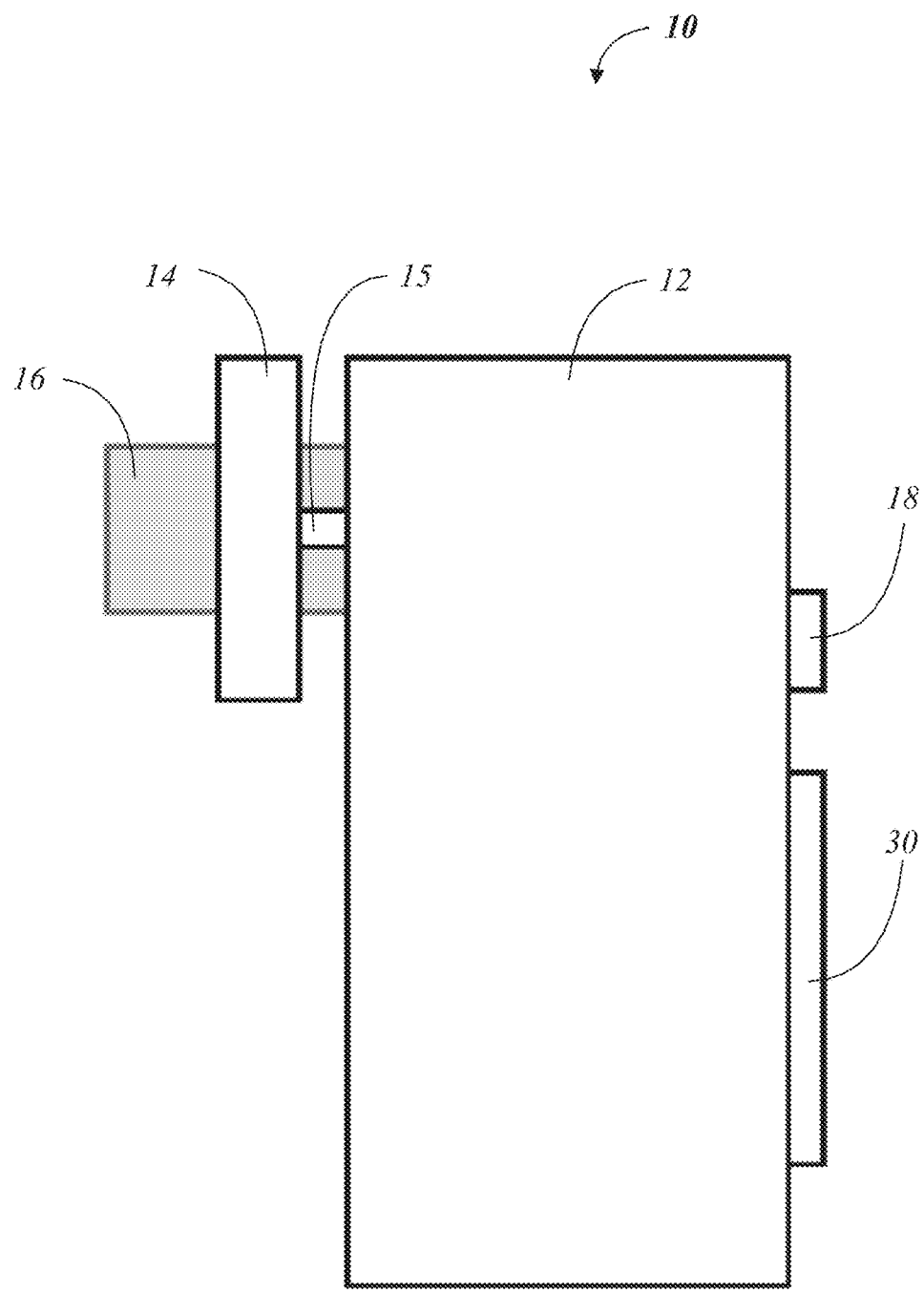
FIG. 5 is a top view of the device.
Figure 6:
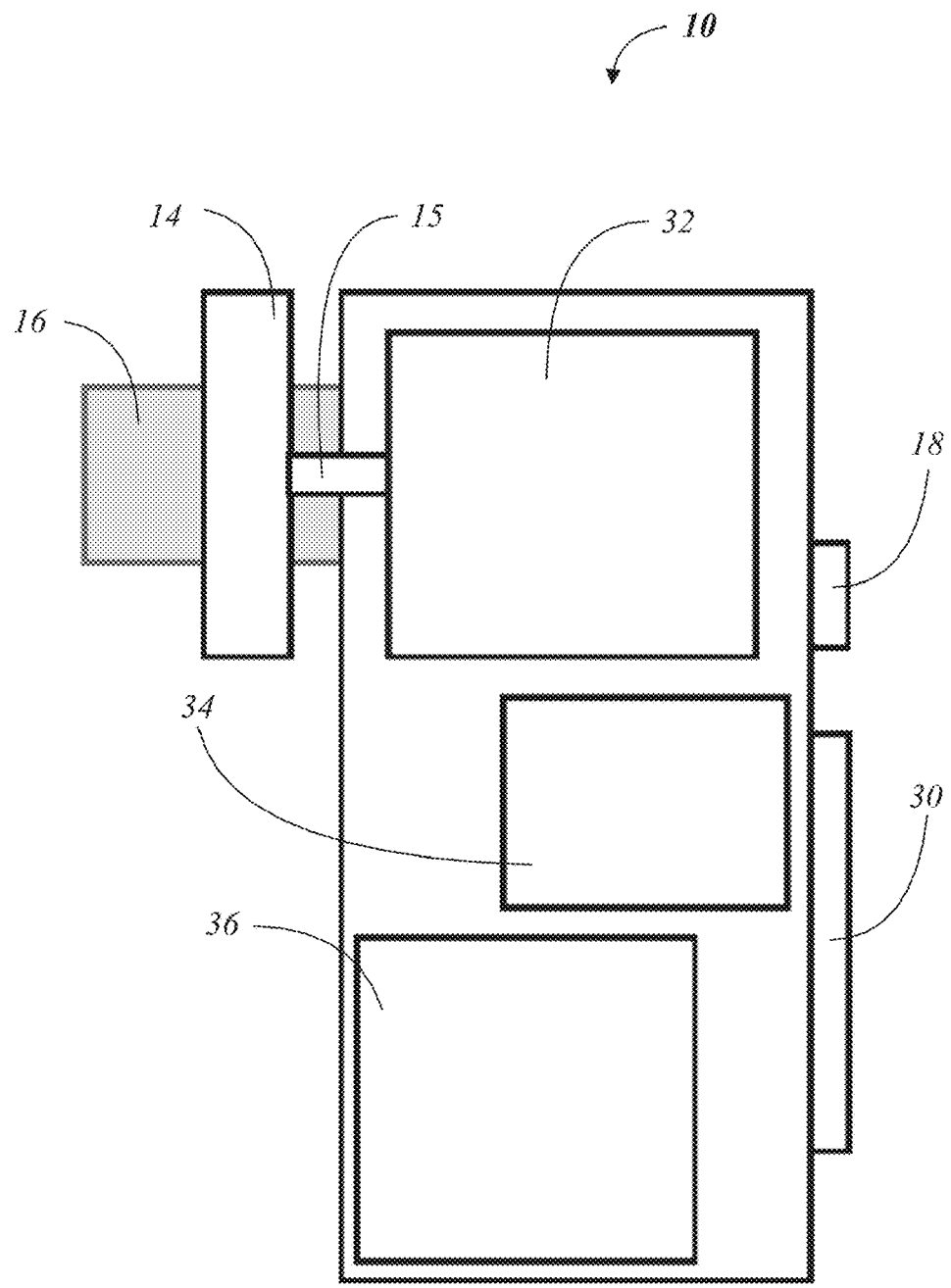
FIG. 6 is a top view illustrating internal component locations.

Measure wheel 14, tension wheel 16, tensioner pulley assembly 18, and universal mounting bracket 30 can be seen in relation to housing 12, refer to FIG. 3 and FIG. 4A. Measure wheel 14, tension wheel 16, and tensioner pulley assembly 18 can be seen in relation to housing 12, FIG. 4B. FIG. 5 illustrates the main component housing 12 as viewed from the top. Measure wheel 14, and tension or pulley wheel 16 are on the right in this view and on the left side you can see tension or pulley assembly 18 and universal mounting bracket 30. FIG. 6 shows the main housing 12 as viewed from the top once again, but the top has been removed to show the internal components. Measure wheel circuit board 32 which utilizes a gear box (not shown), an axle 15, a mechanical to digital sensor (not shown), and measure wheel 14. The preceding components are integrally configured. The mechanical to digital sensor may be any known linear measuring system, such as those manufactured by The Kübler Group (www.kuebler.com). Generally, linear measurement devices can be an odometer, a rotary encoder or shaft encoder, an absolute position encoder, linear variable differential transformer (LVDT), or a rotary variable differential transformer (RVDT). Power supply 34 supplies power for all system components, i.e., the mini PC 36, the touch screen 42, the measure wheel 14, and any peripheral devices. Mini-computer 36 can be an off the shelf hobby PC or similar mini-type PC.

Figure 10:
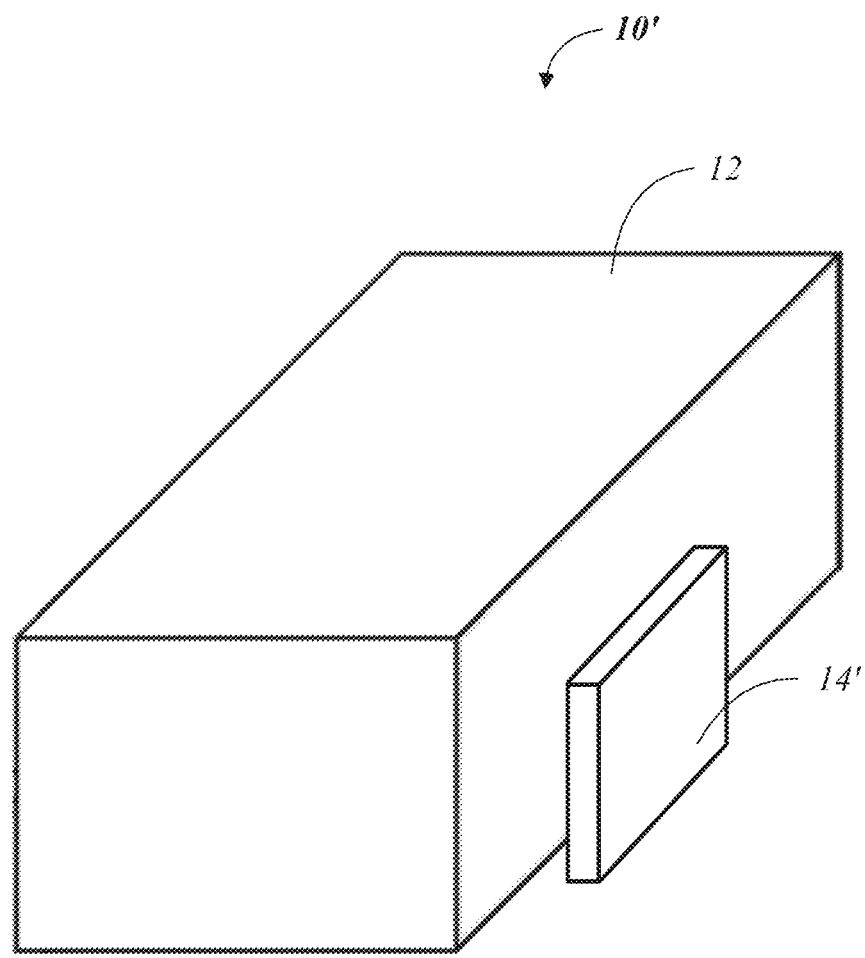
FIG. 10 is a diagrammatically illustration of an alternative embodiment of the invention.

Another embodiment enhances the measuring wheel by integrating a redundant non-contact linear measurement sensor to linear measurement system 10. The linear measuring device may utilize Laser Doppler velocimetry (LDV). The non-contact sensor may be any known linear measurement sensor. A non-limiting example is manufactured by SICK Sensor Intelligence (www.sick.com). The linear measurement system 10 may be direct contact or non-contact. It may be directly or indirectly measured. The linear measurement system 10 may be a combination of some or all the preceding techniques. The linear measurement system may or may not utilize measurement wheel 14. The technique supplies a measurement from which an estimate of length that can be used, processed or displayed by PC 36. FIG. 10 is intended to show a possible alternative configuration of aspects of the invention. For example, as described above, it shows a device 10' which is similar to device 10 of FIG. 1. Component 14' is a linear measuring component as described earlier. It can be any of the measuring wheel 14 of FIG. 1 or the different possible variations of a linear measurement component or sub-assembly (e.g. directed or indirect, contact or non-contact, etc.).

Figure 7A:
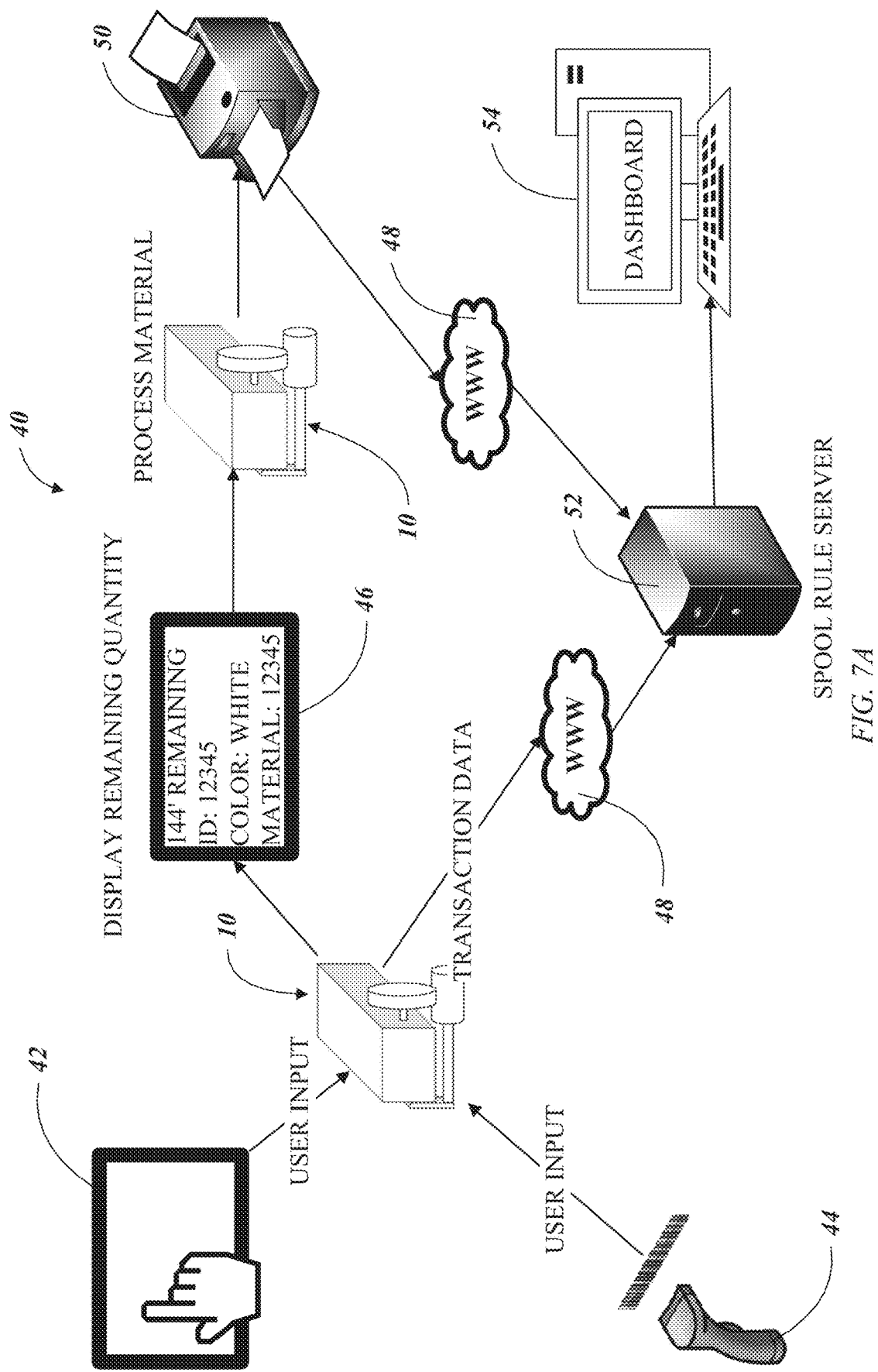
FIG. 7A is a system input/output flow.
Figure 7B:
FIG. 7B is a representative product storage label.

Input/output system 40, refer to FIG. 7A-B, illustrates each system component inter-relationships. Touch screen 42 and bar code scanner 44 are utilized to input material information to computer assembly 36 which is housed within apparatus 10. Touch screen 52 allows a user to manually input information regarding the material to be used if the material does not already have a product storage label 56. A user can input known characteristics such as weight, thickness, or length wherein apparatus 10 can communicate said transaction data via World Wide Web with server 52. Splash page 46 is a real time or near real time visual representation of the material being processed. Apparatus 10 can communicate said transaction data via World Wide Web with server 52. Remaining quantity display 46 indicates the amount of material remaining and may also indicate a unique ID, material color, and material thickness as well other material characteristics. The system 10 is communicating by the World Wide Web with a server 52. Apparatus 10, based on display readout 46 can transfer this transaction data to printer 50 which will create a label 56. Label 56 may indicate varying information such as the type of material, an ID related to that material, it's color, material length remaining, who the user was at the time that the remaining length of material is left on the spool and a time stamp and, of course, a bar code which then can be read by bar code scanner 44 whenever the material is to be utilized again. Also, printer 50 can communicate said transaction data via World Wide Web with server 52. Also, server 52 communicates transaction data to a dash board 54 wherein this dash board is a computer located remotely which indicates what is actively happening with input/output system 40.

Two formulas are generally utilized to determine the length of a coiled product by solving for L. The first formula is for known physical dimensions (i). The second is for known weight (ii), refer to the table of known weights 84, refer to FIG. 9. Column 86 indicates decimal thickness of a material and column 88 indicates Lbs./sq. ft. The equation is applied based on what the user inputs. These are based on metric (millimeters and kilograms) inputs. There is a conversion from standard to metric depending on what units the user enters.

i. Known physical dimensions $$\pi \frac{\left(\left(\frac{D^2}{4}\right) - \left(\frac{d^2}{4}\right)\right)}{T} = L$$

D=outer diameter of the rolled material
D=inner diameter of the rolled material
T=thickness of the material
L=length of the material
ii. Known weight $$(W \times L)B = T$$

W=width
L=length
B=weight (from table below)
T=thickness (from table below)

Figure 8A:
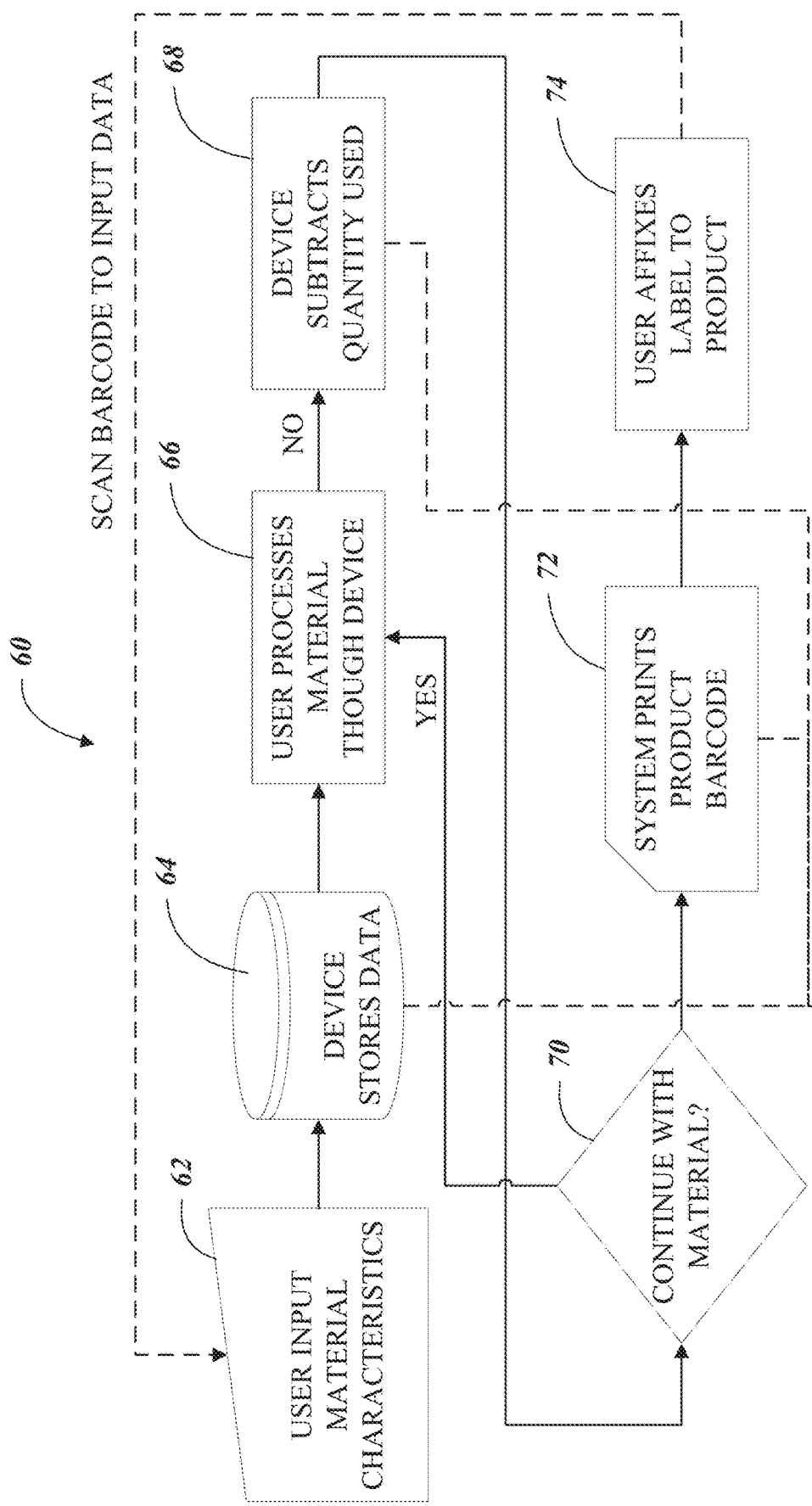
FIG. 8A is a process map flowchart.
Figure 8B:
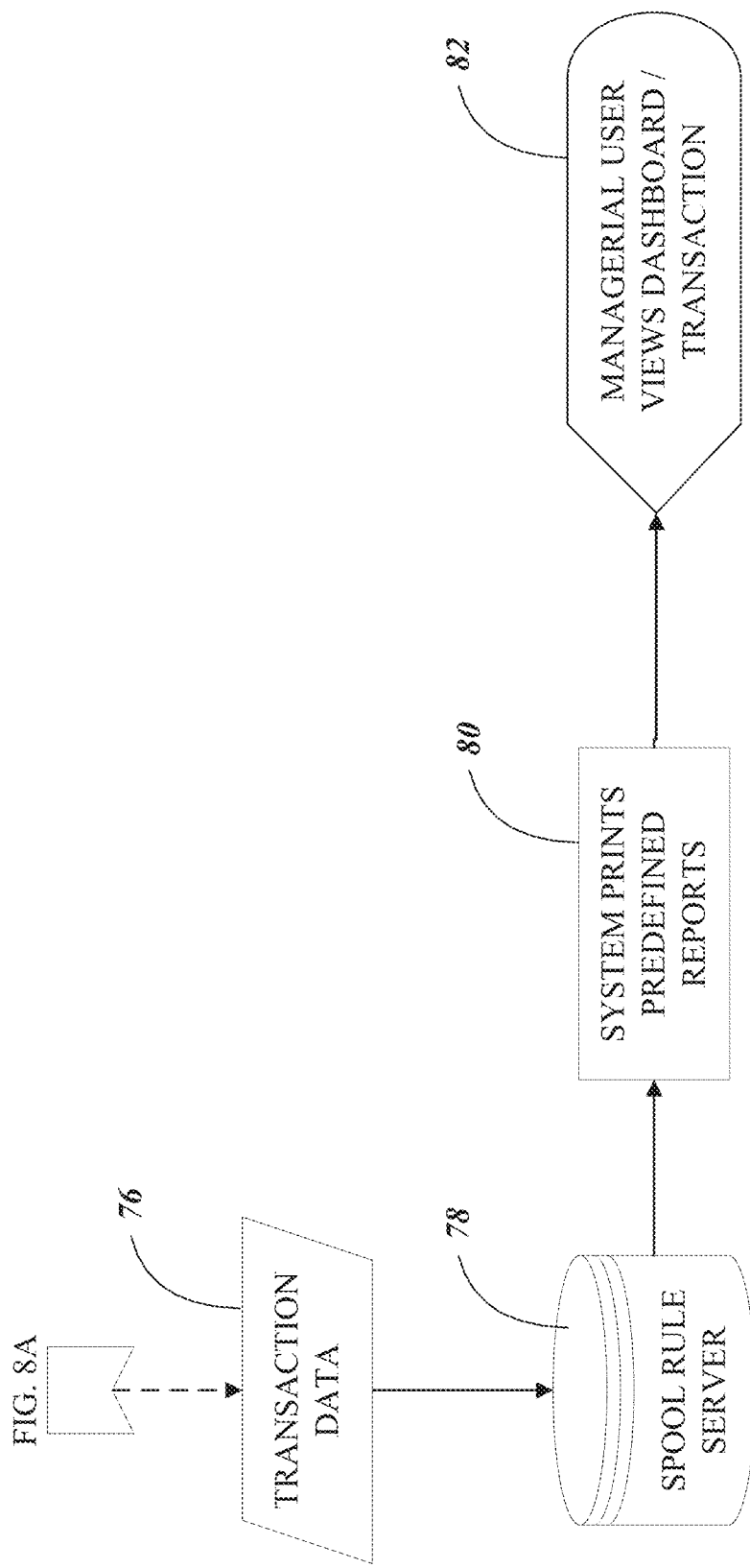
FIG. 8B is a process map flowchart.

User input block 62 of process flowchart 60, refer to FIG. 8A-B, allows a user to input known material characteristics. These known characteristics can be manually entered and/or a bar code scanner 44 can be used, the preceding two formulas actively solve per each term and variable as input by the user at input block 62. The formulas are integral to the software or firmware program which operates on PC 36. User input block 62 transmits material characteristics to database 64 which stores all the data that is input at user block 62. Database 64 simultaneously transmits said transaction data to data block 76. Further, transaction data stored in database 64 is transmitted to material processing block 66. Material processing block 66 transmits the original transaction data from user input block 62 and transaction data related to material processing to subtraction block 68. Subtraction block 68 actively subtracts quantity of material being processed from the original quantity from database 64. As the material is processed through apparatus 10, the total length processed is actively subtracted at block 68 via the two formulas. Hence apparatus 10 maintains a known remaining physical dimension and weight of the coiled product. Subtraction block 68 transmits the resultant material quantity to decision block 70 and simultaneously transmits said quantity to data block 76. If material is to continue being processed, then the answer at decision block 70 is yes. If the answer at decision block 70 is yes, then material processing block 66 allows material processing to continue and all resulting data to be maintained until finished. If the answer at decision block 70 is no, then material processing block 66 stops all material processing. The resultant data from subtraction block 68 is transmitted to action block 72. Action block 72 transmits the resultant transaction data to data block 76. Action block 72 simultaneously transmits resultant transaction data to data block 76. The bar code label created at action block 72 results with a user affixing said label to product at process block 74.

Server 78 receives all transaction data from data block 76. Process block 80 utilizes transaction data stored on server 78 to create and print predefined reports related to said material processing. The predefined reports created at process block 80 are further viewed by managerial user view dashboards/transactions. Further, when the material being processed is ended at block 70 the resultant variables are utilized to print label 56 and system reports 80. The known physical dimension variables are: (a) outer diameter of the rolled material, (b) inner diameter of the rolled material, (c) thickness of the material, and (d) length of the material. The known weight variables are: (a) width, (b) length, (c) weight from table 84, (d) thickness from table 84.

The purpose of the dashboard is to create a portal for a user to view the performance of their business, employees, machines, and materials. The dashboard takes transaction data collected by the Spool Rule computer 36 and generates reports to support business decisions. Reports used in the dashboard preferably include: Summations of machine hours, length of product used by one or more material dimensions (color, brand, thickness, size, etc.), total cost of product used, total cost per job, number of jobs completed, number of open jobs, number of spools/lots liquidated (completely used), total labor hours. All these can be defined by a date range, employee ID, job code, or material dimensions. Reports also include averages (mean) and standard deviation of all the above machine hours, length of product used by one or more material dimensions (color, brand, thickness, size, etc.), total cost of product used, total cost per job, number of jobs completed, number of open jobs, number of spools/lots liquidated (completely used), total labor hours. The dashboard also generates flags or exceptions that alert the user to conditions outside of the band of excellence or tolerance. The thresholds for the band of excellence come as a preset or can be defined by the user (example: any job with material costs over $25,000 are flagged).

The inventory management system described enables a user to input a material of known characteristics such as weight, thickness, and width, or length into a computing device via a user interface and/or a handheld device such as a barcode scanner. Generally, the material is on a coiled roll. The material may be pre-processed and post-processed. Post-processed material characteristics must be maintained to ensure accurate inventory. When a user feeds the material through the system, the material is rolled over a feed wheel, which maintains pressure against and turns a measure wheel. The measure wheel communicates with a computer control chip to deduct the quantity fed off the coil. The system actively calculates the length of the material being processed using two math formulas. The processed length and remaining length are stored locally on a computing device, local servers, and the world wide web (WWW), i.e., cloud services. The actual processed and remaining lengths are shown on a display screen in real time or near real time. When the user is finished working with the material, the user can select to print a label with a barcode and/or text to affix to the processed and remaining coiled material. The barcode contains characteristics of the material so the material can be inventoried and/or reused on the feeder. All material being processed can be accessed in real-time or near real-time via a dashboard interface on local or remote computing devices.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. An apparatus for measuring and identifying a remaining length of coiled material, the apparatus comprising:
   a housing;
   a measure wheel rotatably secured to the housing;
   a tensioner assembly, the tensioner assembly including:
      a pulley wheel rotatably secured to the housing and operatively connected to the measure wheel; and
      a tensioning arm rotatably secured to the housing;
   a power supply;
   a computing assembly operatively connected to the measure wheel, the computing assembly including:
      an I/O board, a video port;
a plurality of USB ports;
an Ethernet port; and
software or firmware which:
(a) receives data from a database;
(b) calculates the remaining length of coiled material based on (i) material spooled through the measure wheel, (ii) a thickness of the material, and (iii) subtraction of a quantity of material being processed from an original quantity taken from the database; and
(c) transmits resulting calculations to a data block to update on-hand inventory data as the material is spooled through the measure wheel;
a display operatively connected to the computing assembly to display, in real time, the length of remaining coiled material; and
a beginning indicia attached to a lead end of the material for identifying parameters of the material;
wherein the material can be inventoried, stored with a product label, and reused on a feeder after working with the material.

2. The apparatus for measuring and identifying a remaining length of coiled material of claim 1 further comprising a printer operatively connected to the computing assembly.

3. The apparatus for measuring and identifying a remaining length of coiled material of claim 1 wherein the product label includes:
(a) a bar code identifying material properties, said material properties including at least the thickness of the material;
(b) text identifying material properties; or
(c) both (a) and (b).

4. The apparatus for measuring and identifying a remaining length of coiled material of claim 3 wherein the material properties include the remaining length.

5. The apparatus for measuring and identifying a remaining length of coiled material of claim 3 wherein the material properties include a unique ID.

6. The apparatus for measuring and identifying a remaining length of coiled material of claim 3 wherein the material properties include the user.

7. The apparatus for measuring and identifying a remaining length of coiled material of claim 3 wherein the material properties include a timestamp.

8. The apparatus for measuring and identifying a remaining length of coiled material of claim 3 wherein the material properties include the weight.

9. A modular apparatus for measuring and identifying a remaining length of coiled material, the apparatus comprising:
a housing;
a linear measuring system secured to the housing, linear measuring system including;
a measure wheel;
a gearbox;
an axle;
a mechanical to digital sensor that generates and counts electric pulses;
a tensioner assembly, the tensioner assembly including:
a pulley wheel rotatably secured to the housing, operatively connected to the measure wheel, and located remote of the mechanical to digital sensor; and
a tensioning arm rotatably secured to the housing;
a power supply;
a computing assembly operatively connected to the measure wheel, the computing assembly including:
an I/O board,
a video port;
a plurality of USB ports; and
an Ethernet port;
a display operatively connected to the computing assembly to display the length of remaining coiled material, said display located remote of the mechanical to digital sensor;
a beginning indicia attached to a lead end of the material for identifying parameters of the material;
a bar code scanner for scanning a bar code identifying material properties; and
coiled material that can be inventoried, stored with a product label, and reused on a feeder after working with the material;
wherein the computing assembly that (a) receives data from a database and (b) calculates a remaining length of the coiled material based on (i) material spooled through the measure wheel and (ii) a thickness of the material, and (iii) subtraction of a quantity of material being processed from an original quantity taken from the database.

10. The apparatus for measuring and identifying a remaining length of coiled material of claim 9 further comprising a printer operatively connected to the computing assembly.

11. The apparatus for measuring and identifying a remaining length of coiled material of claim 9 wherein the product label includes:
(a) the bar code;
(b) text identifying the material properties; or
(c) both (a) and (b).

12. The apparatus for measuring and identifying a remaining length of coiled material of claim 11 wherein the material properties include the remaining length.

13. The apparatus for measuring and identifying a remaining length of coiled material of claim 11 wherein the material properties include a unique ID.

14. The apparatus for measuring and identifying a remaining length of coiled material of claim 11 wherein the material properties include thickness.

15. The apparatus for measuring and identifying a remaining length of coiled material of claim 11 wherein the material properties include the user.

16. The apparatus for measuring and identifying a remaining length of coiled material of claim 11 wherein the material properties include a timestamp.

17. The apparatus for measuring and identifying a remaining length of coiled material of claim 11 wherein the material properties include the weight.

18. The apparatus for measuring and identifying a remaining length of coiled material of claim 9 wherein the mechanical to digital sensor is an odometer.

19. The apparatus for measuring and identifying a remaining length of coiled material of claim 9 wherein the mechanical to digital sensor is a rotary encoder.

20. The apparatus for measuring and identifying a remaining length of coiled material of claim 9 wherein the mechanical to digital sensor is an absolute position encoder.

21. The apparatus for measuring and identifying a remaining length of coiled material of claim 9 wherein the mechanical to digital sensor is a linear variable differential transformer (LVDT).

22. The apparatus for measuring and identifying a remaining length of coiled material of claim 9 wherein the mechanical to digital sensor is a rotary variable differential transformer (RVDT).

23. An apparatus for measuring and identifying a remaining length of coiled material, the apparatus comprising:
a housing;
a linear measuring system secured to the housing;
a power supply;
a computing assembly operatively connected to the linear measuring system, the computing assembly including:
an I/O board,
a video port;
a plurality of USB ports;
an Ethernet port; and
software or firmware which:
(a) receives data from a database;
(b) calculates the remaining length of coiled material based on (i) material spooled through the linear measuring system, (ii) a thickness of the material, and (iii) subtraction of a quantity of material being processed from an original quantity taken from the database; and
(c) updates on-hand inventory data as the material is spooled through the linear measuring system;
a display operatively connected to the computing assembly to display, in real time, the length of remaining coiled material; and
a beginning indicia attached to a lead end of the material for identifying parameters of the material;
wherein the material can be inventoried, stored with a product label, and reused on a feeder after working with the material.

24. The apparatus of claim 23 wherein the linear measuring system comprises:
(a) a measure wheel;
(b) an optical sensor;
(c) a contact sensor; or
(d) a non-contact sensor.

* * * * *